United States Patent [19]

Friedenberg

[11] 4,206,943
[45] Jun. 10, 1980

[54] RETRACTABLE AND EXTENSIBLE TRAILER

[76] Inventor: Martin A. Friedenberg, 26273 Cornwall Ct., Southfield, Mich. 48076

[21] Appl. No.: 819,854

[22] Filed: Jul. 28, 1977

[51] Int. Cl.² .................................................. B62D 33/08
[52] U.S. Cl. ......................................... 296/26; 296/183
[58] Field of Search .............. 296/26, 27, 28 M, 23 C, 296/100, 137 R; 52/66; 105/379

[56] References Cited
U.S. PATENT DOCUMENTS

| | | | |
|---|---|---|---|
| 3,447,831 | 6/1969 | Wagner | 52/66 |
| 3,463,541 | 8/1969 | Garrison | 296/26 |
| 3,588,167 | 6/1971 | Ratcliff | 296/27 |
| 3,694,024 | 9/1972 | Linville | 296/26 |

*Primary Examiner*—John J. Love
*Assistant Examiner*—John A. Carroll
*Attorney, Agent, or Firm*—Basile and Weintraub

[57] ABSTRACT

A trailer having vertically extensible and retractable sidewalls is disclosed herein. The trailer includes a plurality of tracks in which are vertically axially mounted guide rods. The guide rods are secured to upper sections which vertical raise or lower in the tracks. The guide rods are power operated to facilitate movement.

4 Claims, 3 Drawing Figures

RETRACTABLE AND EXTENSIBLE TRAILER

BACKGROUND OF THE INVENTION

1. Field of the Invention

The present invention pertains to trailers. More particularly, the present invention pertains to means for varying the height of trailer walls and the trailers obtained thereby. Even more particularly, the present invention pertains to trailers having vertically extensible and retractable walls.

2. Prior Art

As is known to those skilled in the art to which the invention pertains, tractor-trailer assembles have been provided with innovations and accoutrements, designed to facilitate the transfer of a load. However, little attention has been paid to the driving of the assembly when the trailer is either unloaded or only partly loaded.

Present day trailers, generally, have standard size frames with fixed height sidewalls. This inherently creates problems. For example, when loaded to less than capacity, there is created the problem of shifting packages and cartons. This, in turn, leads to breakage and damage and the concomittant loss in dollars. Another problem encountered is more directed to the structure, per se. Because of the fixed height of the walls of the trailer, the driver must rely solely upon side view mirrors for rear viewing. This, of course, creates a serious disadvantage to the driver. Furthermore, this reliance solely on side mirrors is present regardless of the presence or absence of a load in the trailer.

Furthermore, the air resistance about the trailer is constant due to the fixed height trailer walls. By being able to shorten the height of the walls and, therefore, the area thereof the resistance to air is reduced thereby giving somewhat increased fuel mileage.

For all of these reasons, a benefit to the art would be provided by a trailer having extensible and retractable sidewalls. It is to this to which the present invention is directed.

PRIOR ART STATEMENT

Applicant is not aware of any relevant prior art.

SUMMARY OF THE INVENTION

In accordance with the present invention, there is provided a trailer having extensible and retractable sidewalls. The walls comprise upper and lower members. The trailer, also, includes interconnecting guide rods and rails for guiding the upward and downward movement of the upper wall members.

Power operated screw jacks are connected to the guide rods for effectuating movement thereof. The guide rods are disposed within the rails for the guiding movement thereof.

Limiting means are provided for limiting the upward and lower movement of the rods within the rails or tracks or channels.

For a more complete understanding of the present invention, reference is made to the following detailed description and accompanying drawing. In the drawing, like reference characters refer to like parts throughout the several views in which:

DESCRIPTION OF THE PREFERRED EMBODIMENT

Figure 1:
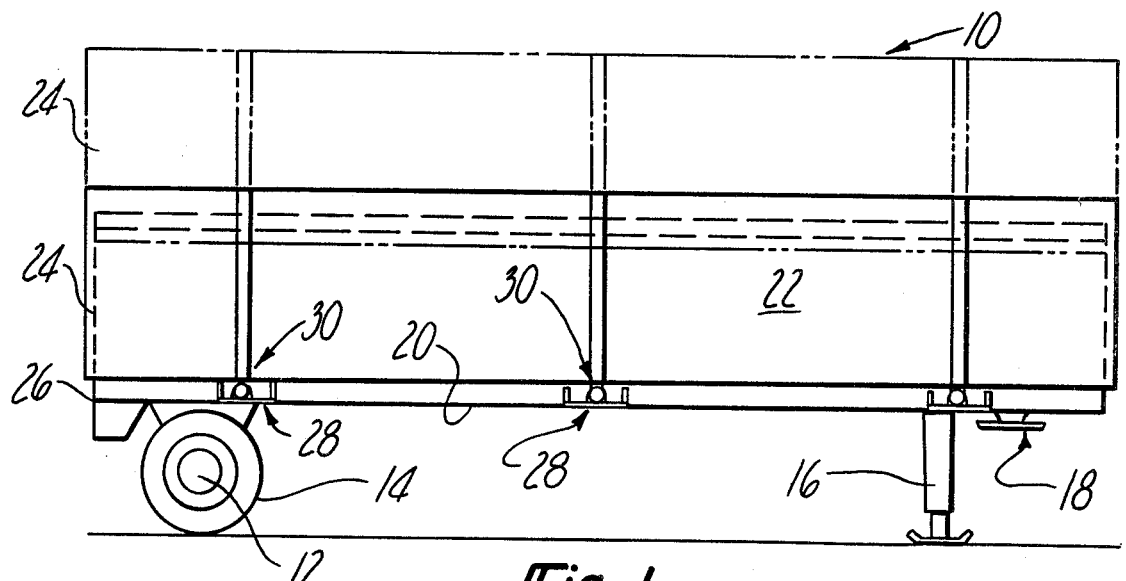
FIG. 1 is a side elevational view, partly in phantom, of a trailer in accordance with the present invention.
Figure 2:
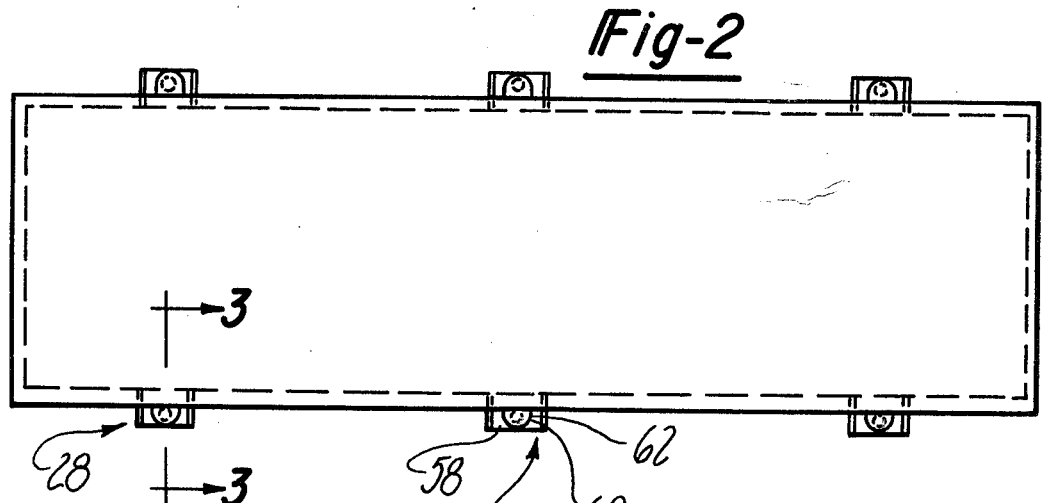
FIG. 2 is a top plan view of the trailer hereof.

Now, and with reference to the drawing, and in accordance with the present invention, there is depicted therein a trailer 10. The trailer 10, generally, comprises a rear axle 12 having wheels 14 mounted thereon. The forward end of the trailer is fitted with a hydraulic foot 16 or similar member. The trailer ordinarily is interconnected to a tractor through a conventional king pin assembly 18. These general features of the trailer are within the known parameters of the skilled artisan. Furthermore, and as is known to the skilled artisan, the trailer 10 has a frame 20.

Upstanding from the frame is an enclosing sidewall 22 in accordance with the present invention.

The sidewall 22 comprises an upper member 24 and a lower member 26. In accordance herewith, the lower member 26 is fixed in position while the upper member 24 is moveable with respect thereto. In this manner, the sidewall is rendered vertically adjustable as depicted in accordance with the phantom lines of FIG. 1.

The upper member 24 is rendered moveable with respect to the lower member 26 through a guide rod and rail assembly generally denoted at 28. Means 30 is used to move the guide rod.

More specifically, and in accordance with the present invention, circumferentially disposed about the frame 20 are a plurality of the guide rod and rail assemblies 28. Associated with each assembly 28 is the moving means 30.

It is to be understood that in the practice of the present invention, each assembly 28 is similarly constructed. Therefore, for purposes of facilitating an understanding of the present invention, only one such assembly 28 and means 30 shall be detailed. However, it is to be understood that each assembly is similar.

Figure 3:
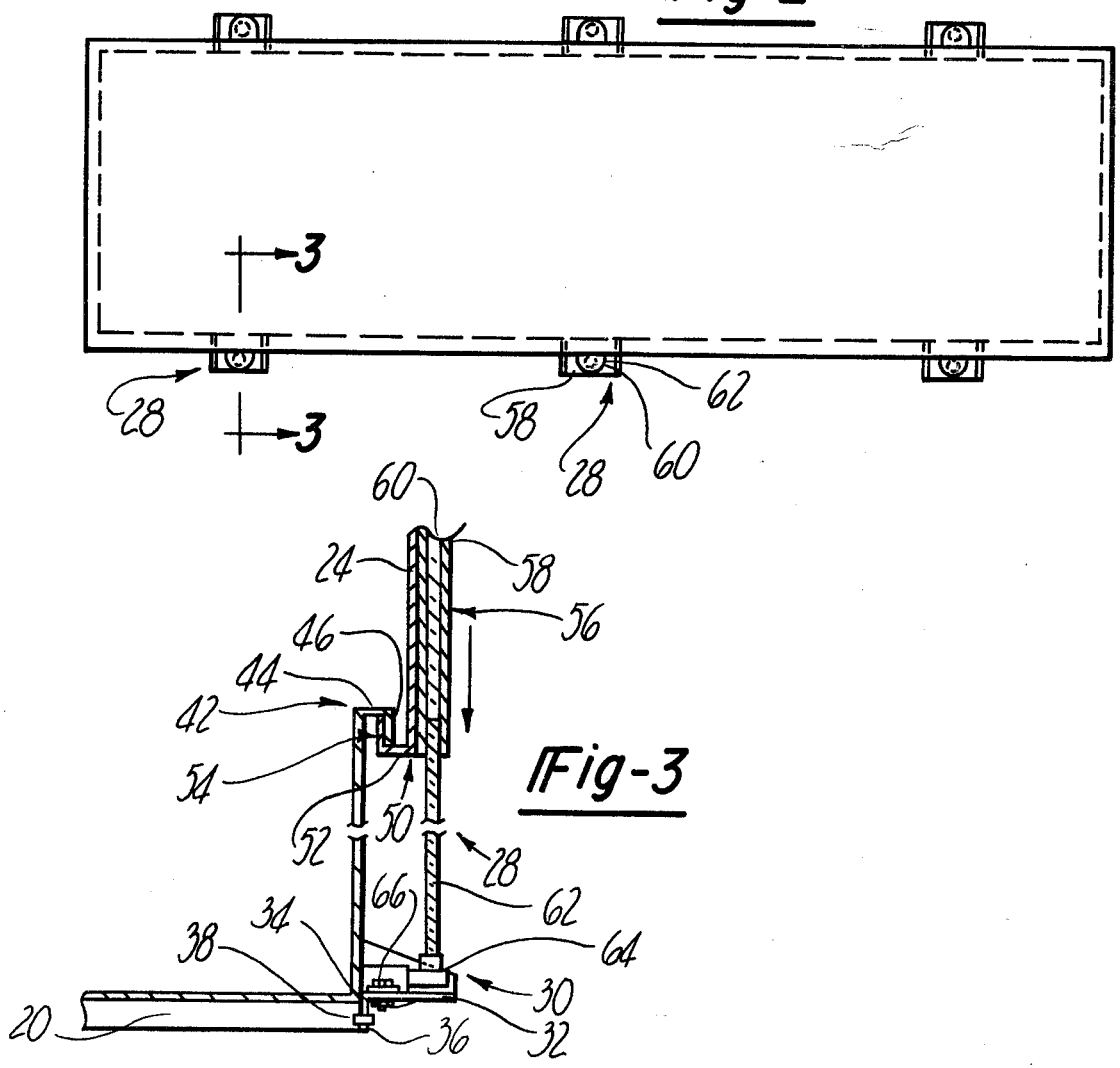
FIG. 3 is a cross-sectional view taken along line 3—3 of FIG. 2.

Referring now to FIG. 3, there is depicted therein the construction of an assembly 28 and means for moving same, as denoted by the numeral 30.

Secured to the frame 20 and extending laterally outwardly therefrom is a pad 32. The pad 32 generally comprises an L-shaped member having first and second legs 34, 36, respectively. The leg 36 is secured to the frame in fixed position by any suitable mode such as fastening means 38. The other leg 34 projects laterally outwardly from the frame, as shown. The leg 34 defines a platform upon which is mounted the means 30.

As shown in FIG. 3, the lower wall member 26 is integrally formed with the bed of the trailer and is substantially perpendicular thereto. The upper or free end of the wall member 26 terminates in a right angled flange 42. The right angled flange 42 comprises a bight section which extends laterally outwardly from the upper terminus of the wall and is substantially perpendicular thereto. The flange further comprises a downwardly depending leg 46 which is integral with the free end of the bight 44. The leg 46 extends substantially parallel to the wall 26, as shown. The bight section 44 defines an upward stop for limiting the upward movement of the upper wall member 24 in a manner to be described hereinafter. In a preferred form of practicing the present invention, the flange 42 is integrally formed with the lower wall member 26.

The upper wall member 24 comprises a right angled flange 50 disposed at the lower terminus thereof. The flange 50 is opposed to and engages the associated right angled flange 42 associated with the lower wall 26. The flange 50 includes a bight section 52, which extends laterally inwardly from the lower terminus of the upper wall member 24 and is integrally formed therewith. The bight section is substantially perpendicular to the wall. An upwardly extending leg 54 is integrally formed with the bight and extends upwardly therefrom, substantially perpendicular thereto and is substantially parallel to the wall 24, as shown. The upper end of the leg 54 abuts against and engages the under surface of the bight section 44 when the upper wall member reaches its upward most extension. In this manner, the interengagement between the two flanges defines a limit for the upward movement of the wall section or member 24. In FIG. 3 hereof, there is illustrated the interengagement between the flanges at the limit for upward movement of the wall 24.

Secured to the exterior of the upper wall member 24 is the rail 56 of the assembly 28. The rail 56 comprises an extrusion or extruded member 58 having a central throughway or channel 60. Fixedly disposed within the channel 60 is the guide rod 62 of the assembly 28. The rod 62 is press fitted within the channel to avoid disengagement therebetween. By having the rod press-fitted within the channel, the channel and, thus, the wall 24 is responsive to any movement imparted to the rod.

The rod has one end thereof secured to the means 30.

As shown in the drawing, the channel 60 comprises a substantially C-shaped configuration in which is slideably mounted the guide rod 62.

As heretofore noted, the lower end of the rod is mounted to the means 30.

The means 30 hereof comprises any power source which can move the rod in response thereto. Preferably, and in accordance with the present invention, the means 30 comprises a screw jack 64. The screw jack 64 is mounted onto the pad 32 and is fixed thereto via fastening means 66.

It should be noted with respect hereto that the screw jacks of the type under consideration herein are well known. For example, there are those sold by Warner Electric under the name "Actutator." This type of screw jack is electrically operated screw jack having a load rating of 1000 pounds within an extension rate of 1.1 inches per second.

In practicing the present invention, it is to be understood that other means for actuating the screw jacks can be utilized, such as pneumatic pressure, hydraulic pressure, as well as electrical energy.

In accordance with the present invention, each of the assemblies 28 are connected together in powered relationship such that they coact simultaneously and coextensively. Suitable means (not shown) extend from the cabin of the tractor to each screw jack to supply the necessary power to operate each of the screw jacks simultaneously. Thus, as power is supplied to rotate the shaft of each screw jack in a first direction, the motion imparted thereto is translated to the guide rod and, thus, to the reel to move the wall 24 in response thereto. Assuming the output of the screw jack being such to raise the wall section 24, the extension will continue until the two flanges interengage. The downward movement caused by the reverse rotation of the shaft continues until the lower end of the wall engages the pad.

It is to be appreciated by the practice of the present invention that the height of the walls of the trailer can be varied over a wide range.

It is to be appreciated that there has been described herein a trailer having variably extensible and retractable sidewalls.

Having, thus, described the invention what is claimed is:

1. A trailer having at least one height variable sidewall, comprising:
   (a) a frame
   (b) at least one trailer sidewall defined by a lower wall member fixed to the frame and,
   an upper wall member disposed adjacent the lower wall member, the two wall members cooperating to define the trailer sidewall,
   (c) means for vertically adjusting the upper wall member comprising:
   (1) a guide rail assembly supportingly mounted to said upper wall having a guide rail secured to the upper wall member and rod having a threaded portion fixedly mounted to the guide rail, and
   (2) screw jack means for extending and retracting said rod, said screw jack means including a pad disposed laterally outwardly from the trailer frame, and secured thereto, said pad defining a support for said screw jack means, said screw jack means engaging said threaded portion of said rod to extend and retract said rod such that movement of the rod causes movement of the upper rail in response thereto such that the height of the sidewall is variable, and
   (3) means for powering the screw jack.

2. The trailer of claim 1 which further comprises:
means for limiting the upward movement of the upper wall member.

3. The trailer of claim 2 which comprises:
   (a) a right angled flange formed at the upper terminus of the lower wall, the flange having a first leg extending laterally outwardly from the wall and a second leg downwardly depending from the first leg,
   (b) a right angled flange formed at the lower terminus of the upper wall, the flange having a first leg extending laterally inwardly from the wall and a second leg upwardly extending from the first leg, and
   wherein the upper end of the second leg of the upper wall flange is engageable with the first leg of the lower wall flange to limit the upward movement of the upper wall such that the flanges cooperate to define the limiting means.

4. The trailer of claim 1 which further comprises:
   (a) a plurality of guide rails secured to the upper wall and spaced therearound,
   (b) a rod associated with each guide rail, and
   (c) means for extending and retracting each rod, and wherein each rod moves simultaneously and equally.

* * * * *